Sept. 1, 1931.   P. R. DRENNING   1,821,296
TRUCK BOLSTER WITH SPRING SUPPORTED SIDE BEARINGS
Original Filed Oct. 7, 1926   3 Sheets-Sheet 1
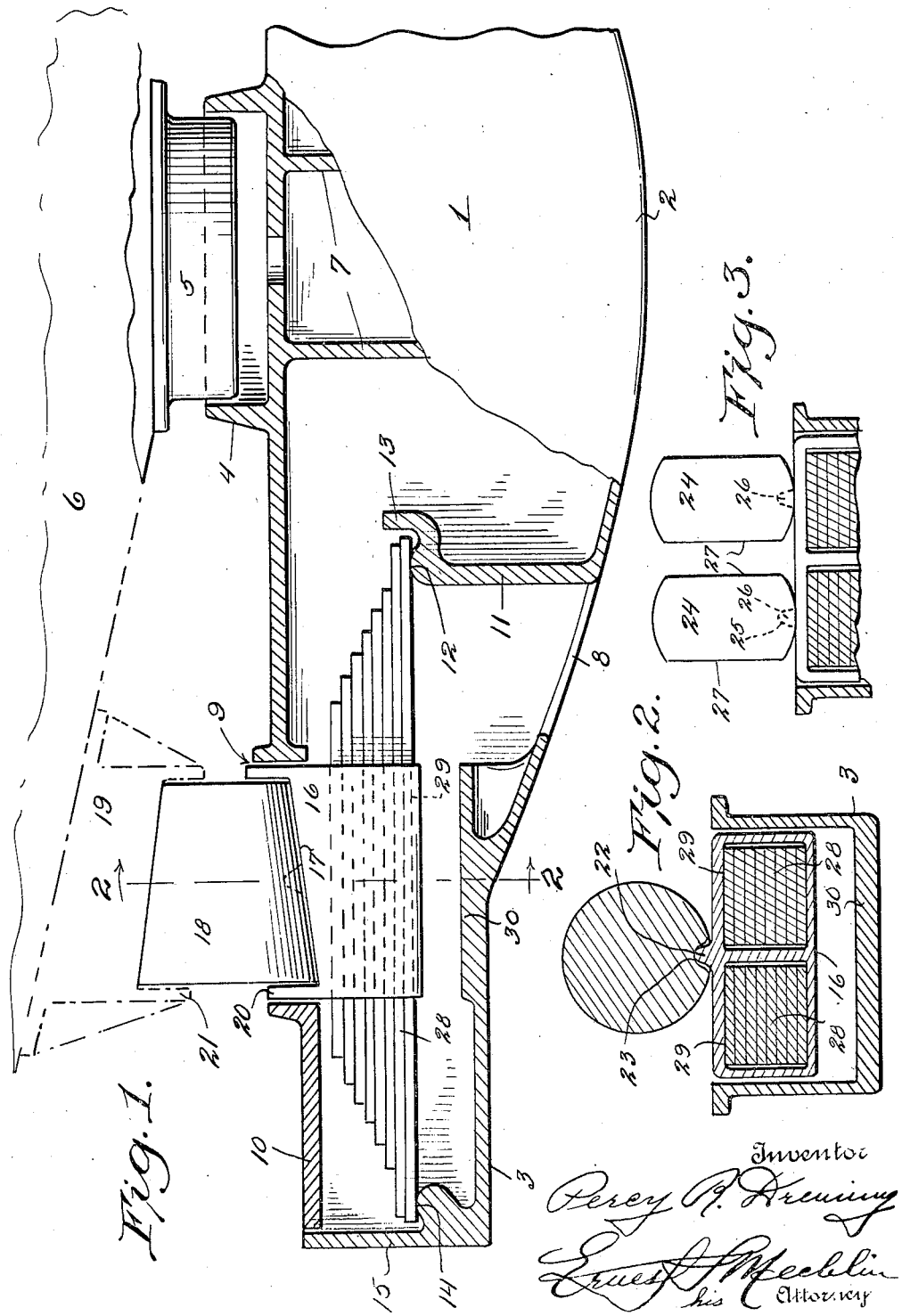

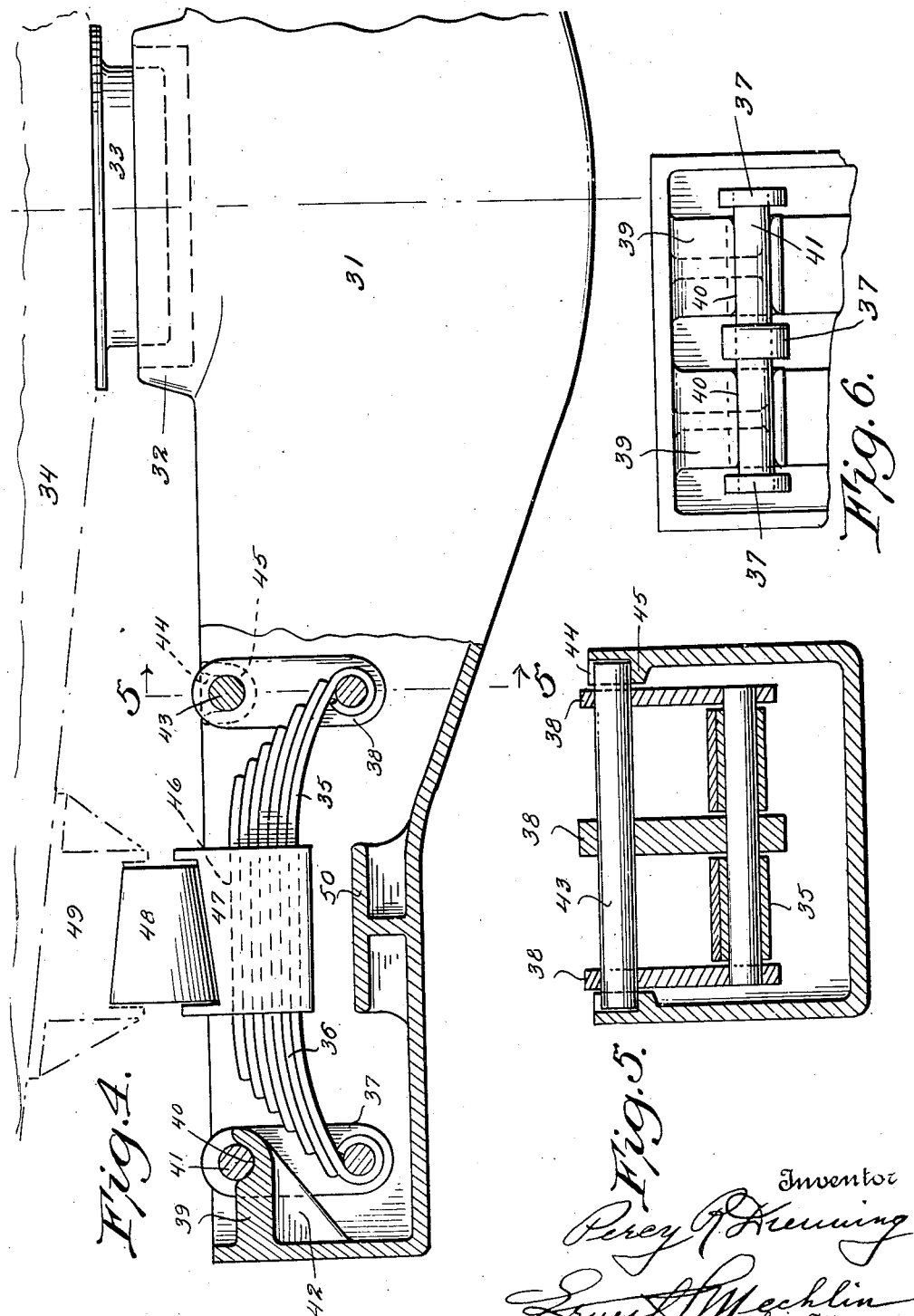

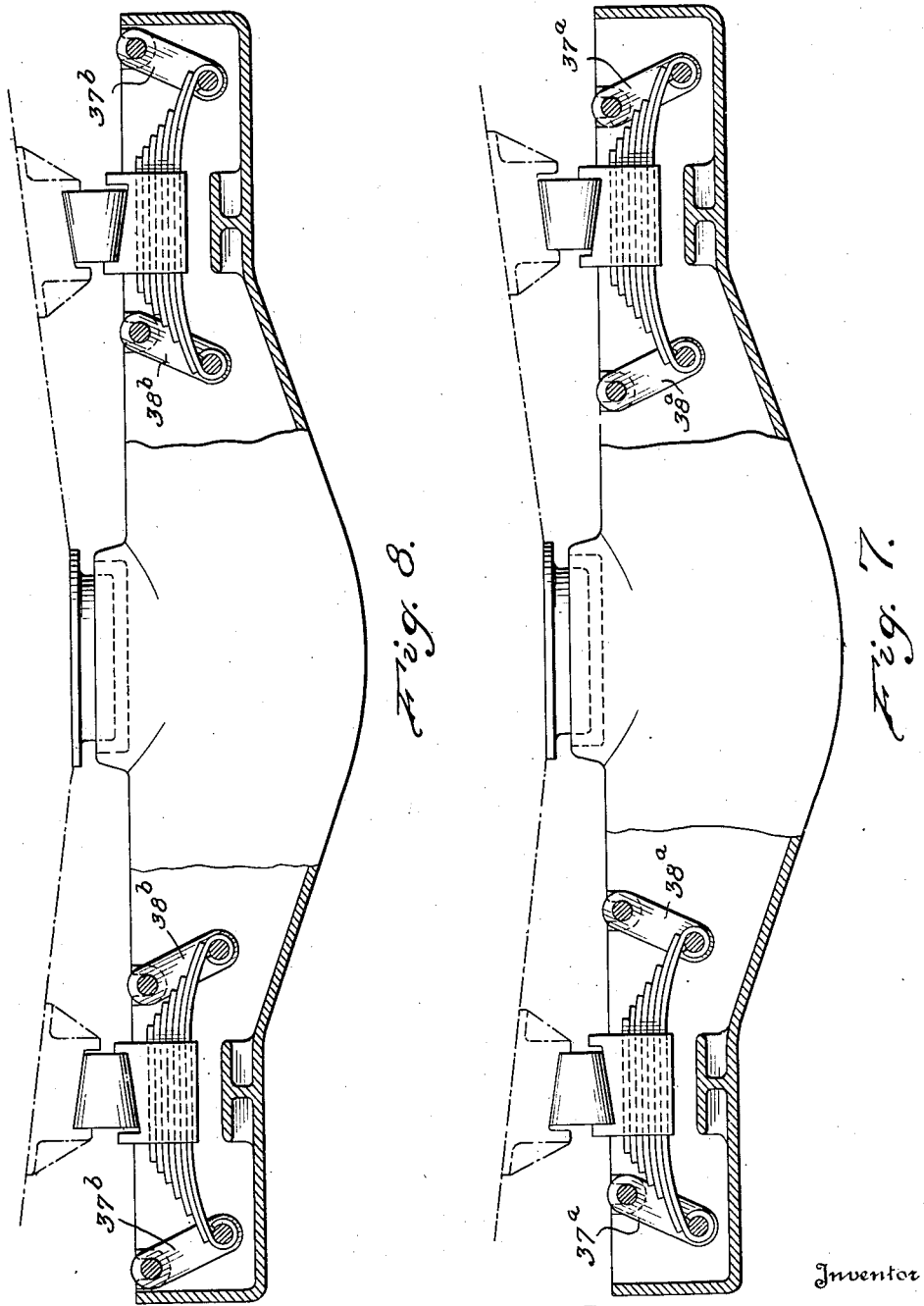

Patented Sept. 1, 1931

1,821,296

UNITED STATES PATENT OFFICE

PERCY R. DRENNING, OF BALTIMORE, MARYLAND, ASSIGNOR, BY MESNE ASSIGNMENTS, TO T. H. SYMINGTON AND SON, INC., OF BALTIMORE, MARYLAND, A CORPORATION OF MARYLAND

TRUCK BOLSTER WITH SPRING SUPPORTED SIDE BEARINGS

Application filed October 7, 1926, Serial No. 140,184. Renewed January 14, 1931.

The invention relates to railway car truck bolsters.

The principal object of the invention, generally stated, is to provide a bolster having a novel arrangement of spring supported side bearings which coact with bearing elements on the car body bolster for sustaining the load.

An important object of the invention is to provide a bolster embodying forms of semielliptic springs for supporting the side bearings, the springs being associated with and carrying combined shackle and bearing means for supporting rollers which engage beneath or within suitable bearing elements depending from the car body bolster.

Another object of the invention is to provide a bolster in which the springs for supporting the side bearings may be either initially flat or curved and mounted either upon stationary supports or movable supports depending upon whether the structure is or is not intended to permit lateral motion of the body bolster.

A further object of the invention is the provision of a bolster in which the entire load is sustained by a plurality of plate or leaf springs of either the flat or curved type entirely housed within the ends of the bolster and so connected therewith that the bolster may be shipped and handled in assembled form ready to be installed within a truck.

Still another object of the invention is to provide a bolster which is provided internally with emergency stop means designed to take an overload upon the springs so as to avoid injury thereto as the result of excessive flexure.

Another important object of the invention is to provide a truck bolster having side bearings so supported upon spring means as to permit lateral motion of the body bolster, the spring supporting means being bodily shiftable upon tendency of the body bolster to move laterally, the arrangement being such that gravity will act to restore the parts to normal position subsequent to such lateral motion.

Another object contemplated by the invention is a spring mounting for the side bearings of such character as to be capable of arrangement in such manner as to exert a lifting force upon the car in the event that lateral motion occurs.

A still further object of the invention is the provision of a bolster equipped with the side bearing supporting springs and of such construction that access may be readily had to the latter for the purpose of making repairs or replacements in case such should be necessary after prolonged service.

A still further object of the invention is the provision of a bolster in which the combined spring shackle and bearing member may carry either a single roller or a plurality thereof for cooperation with the bearing members provided on the car body bolster, means being furthermore provided for maintaining the rollers in proper operative relation to the combined spring shackle and bearing means and effecting return thereof to normal position after relative swivelling movement of the body and truck bolsters has occurred.

An additional object is the provision of a bolster equipped with the spring supported side bearing structure above mentioned and which will be comparatively simple and inexpensive to manufacture, assemble and install and which may moreover be used to replace an ordinary bolster of conventional pattern without necessitating the making of any alterations in the side frames or other parts of a truck.

With the above and other objects and advantages in view, the invention preferably consists in the arrangement and combination of parts and detailed structural features to be hereinafter more fully described and claimed, and illustrated in the accompanying drawings in which:

Figure 1 is a vertical longitudinal section through one end of a truck bolster embodying one form of the invention, the body bolster and one bearing member thereon being indicated by dot and dash lines, Figure 2 is a cross sectional view taken on the line 2—2 of Figure 1 showing the employment of a single side bearing roller, Figure 3 is a view similar to Figure 2 but showing a slight modification in which use is made of a plurality of rollers, Figure 4 is a view partly in elevation and partly in section showing one end of a bolster in which the side bearing supporting spring means is arranged to permit lateral motion of the body bolster, Figure 5 is a detail section on the line 5—5 of Figure 4, Figure 6 is a fragmentary plan view of one end of the bolster showing the spring suspension means, Figure 7 is a view partly in side elevation and partly in section showing the truck and body bolsters with the shackles arranged to provide a banking action when rounding curves, and Figure 8 is a similar view showing the shackles arranged in the opposite manner to reduce the banking effect.

Referring more particularly to the drawings, and especially Figures 1 to 3 inclusive, the numeral 1 designates the truck bolster as a whole, this bolster being preferably of a shape conforming, generally, to accepted designs so as to be capable of employment to replace a bolster of ordinary type without involving the making of changes in the side frames or other parts of the truck in which it is used. However, there is no particular limitation in this respect. Furthermore, the specific construction of the bolster may be varied within wide limits though it is here shown as having an arched central portion 2 with an extension 3 at each end. Attention is directed to the fact that as both ends are the same only one is illustrated and described as such is entirely adequate to give a full and clear understanding as to the construction and operation. The bolster is represented as provided centrally of its top with a circular flange 4 which constitutes centering means for the center plate 5 which depends from the body bolster 6. In view of the fact that the bolster embodies side bearings which sustain the load at all times, the center plate 5 is spaced from the bolster though located within the confines of the flange 4 so that this flange will have a guiding action during relative swivelling movement of the truck and body bolsters. It is preferable that the bolster be provided internally with transverse webs 7 at the central portion thereof for reinforcement purposes and it is also advisable to have the bottom formed with an opening 8 near the juncture of the central or arch portion 2 with the end portion so as to permit the escape of water or any foreign matter which may enter the bolster during service.

The bolster is of course of hollow formation and the top of the end portion 3 is open as indicated at 9 for the accommodation of the side bearing structure to be described. The outer end of the open top is adapted to be closed by a removable cover plate 10 which may be secured in place by any desired means whatsoever, this detail being immaterial. The lower portion of the bolster is provided with an upstanding web or wall member 11 providing a seat 12 adjacent which is an upstanding retaining flange 13. Within the outer end of the bolster there is provided a seat 14 preferably in the same horizontal plane with the seat 12 and located adjacent the outer end wall 15.

The side bearing structure comprises a bearing member 16 located within the opening 9 and between the inner edge thereof and the inner edge of the cover plate 10, this bearing member preferably having an inclined upper surface 17 upon which rests a tapered roller 18 which cooperates with the side bearing element 19 depending from the body bolster. Displacement of the roller 18 longitudinally is prevented by the provision of upstanding flanges 20 on the bearing member 16 and depending flanges 21 on the bearing member 19, these flanges being located adjacent the ends of the roller. It is preferable that the roller be formed with a socket 22 accommodating a tooth 23 on the bearing member 16 for centering purposes or for maintaining the roller in proper relation to the bearing members 16 and 19 at all times.

Instead of employing the single roller disclosed in Figure 2, use may be made of a plurality of rollers 24 as shown in Figure 3, in which event each is preferably formed with a socket 25 receiving a tooth 26 on the bearing member. In Figure 3 the rollers are represented as having their sides flattened at 27 to provide the necessary clearance between them. Obviously, other variations may be resorted to in such details if found advisable for any reason.

The spring means cooperating with the bearing member 16 is shown, in Figures 1 to 3, as comprising a plurality of superposed elongated plate or leaf springs 28 which may be of progressively decreasing lengths, the longest being at the bottom of the group or bank and resting upon the seats 12 and 14. Clearly, any desired number of such banks may be employed though in Figure 2 I have illustrated two banks side by side and fitting within openings 29 through the member 16 which thus constitutes a shackle as well as a bearing member for the roller 18.

As mentioned above, the structure is identically the same at both ends of the bolster and in the operation it will be readily apparent that the entire load is sustained by the banks or groups of springs 28. This is of advantage for many well recognized reasons, one of which is that the rollers 18 are held always in engagement with the depending bearing elements 19 carried by the body bolster and the bearing members 16 supported by the springs, there being consequently no play between the rollers and the coacting bearing members and, therefore, an absence of shocks and jars which are known to have such a deteriorating effect upon the parts of trucks of that type in which the load is sustained by the center bearing with impact coming upon the side bearings from time to time during car travel. Owing to the fact that the load is sustained entirely by the banks or groups of springs, it is apparent that there is a constant yielding or cushioning action which will insure proper resilience at all times and relieve all the parts of the truck from excessive strains. To take up an overload and avoid the bringing of undue flexure upon the plate or leaf springs, the bottom wall of the bolster is preferably provided with a thickened portion 30 beneath the bearing member 16 so that the latter may engage thereagainst in case the springs go solid, this thickened portion having sufficient strength to withstand the pressure.

In Figures 4, 5 and 6 I have illustrated a modified form of the invention in which lateral motion of the body bolster is permitted. Referring to these figures in detail, the numeral 31 designates the bolster which is provided centrally of its top with a guide flange 32 receiving the center plate 5 which depends from the body bolster 34, the flange or guide 32 being, however, elongated so as to permit relative movement of the truck and body bolsters laterally of the car or what is known as lateral motion. Both ends of the bolster are identical and for this reason only one is shown and described. This form of invention differs from that above described in several particulars, one being that the lower or master leaf 35 of the bank or group of springs 36 is connected at its ends with shackles 37 and 38 which are suspended within the bolster in any suitable manner. In the present instance the shackle 37 is represented as suspended from arms or shelf members 39 in the outer end of the bolster, these members being notched at 40 on their upper surfaces to accommodate the shaft or rod 41 which forms part of the shackle, the arms or shelf members being preferably reinforced by webs 42. The shackle structure 37 is represented as having its upper rod or shaft 43 fitting within sockets 44 in thickened portions 45 on the opposite sides of the bolster. Any desired number of banks or groups of springs 36 may be provided though I have illustrated two arranged side by side and fitting within openings 46 in a combined bearing and shackle member 47 which corresponds to the member 16 of the first described form of the invention and which carries a tapered roller 48 cooperating with a depending bearing element 49 on the body bolster. In this form it is likewise preferable to provide an impact receiving member 50 on the bottom of the bolster beneath the bearing member 47 for the purpose of taking the strain in case the springs go solid.

In Figure 4 it will be observed that the shackles 37 and 38 are parallel and extend vertically but attention is called to the fact that there is no restriction as to this particular arrangement inasmuch as it may be highly desirable to hang the shackles or links at an angle to the vertical for effecting raising or lowering of either side of the car body during lateral motion. In Figure 7 the shackles 37ᵃ and 38ᵃ are arranged in a position inclined with respect to the vertical so that when lateral motion occurs the side bearing at the end of the truck bolster at the outside of the curve passed over will be elevated, the other side bearing being correspondingly lowered. In Figure 8 the reverse arrangement is shown, the shackles 37ᵇ and 38ᵇ being inclined in a direction opposite that shown in Figure 7 so that when lateral motion occurs the side bearing at the outer end of the truck bolster with respect to the curve passed over will be lowered and the other side bearing correspondingly elevated. This would be of benefit in case there is an excessive elevation of the outer rail at the curve. Aside from the question of lateral motion, these forms of the invention operate in substantially the same manner as the first described form insofar as cushioning action, etc. are concerned.

While I have shown and described two preferred embodiments of the invention, one involving the employment of flat plate springs and the other a series of curved springs, it should be understood that there are no particular limitations in this respect as it is conceivable that various alternative arrangements may be adopted. Likewise, the manner of mounting the springs in either instance is simply for purposes of illustration as other methods may be employed. As a matter of fact I reserve the right to make all such changes in the details of construction as well as the combination and arrangement of parts as will widen the field of utility and increase the adaptability, provided such variations constitute no departure from the spirit of the invention or the scope of the claims hereunto appended.

Having thus described the invention, I claim:

1. In combination, a body bolster having a center plate and side bearing elements, a truck bolster having an upstanding guide receiving the center plate, bearing members mounted within the ends of the truck bolster, rollers located between said bearing elements and said bearing members, and a bank of plate springs located within the truck bolster and connected with each bearing member for sustaining the load.

2. In combination, a body bolster having a center plate and side bearing elements, a truck bolster having an upstanding guide receiving the center plate, bearing members mounted within the ends of the truck bolster, rollers located between said bearing elements and said bearing members, and a bank of plate springs connected with each bearing member for sustaining the load, each bearing member having an opening therethrough through which the plate springs extend whereby to constitute shackle means for the springs.

3. In combination with a body bolster having a center plate and depending bearing elements, a truck bolster having a guide receiving said center plate for permitting relative swivelling movement of the truck and body bolsters, supporting means within each end of the truck bolster, a bank of elongated plate springs having its ends engaged upon said supporting means, a combined shackle and bearing member mounted on the intermediate portion of the bank of springs, and rollers engaged upon said combined shackle and bearing members and engaging said bearing elements depending from the body bolster.

4. In a truck bolster, side bearing members mounted therein near the ends thereof, and a bank of elongated plate springs located beneath and engaging each bearing member, said springs extending longitudinally within the bolster.

5. In a truck bolster, a side bearing member within each end thereof, a bank of plate springs extending longitudinally within the bolster and passing through the bearing member, and means supporting the ends of the springs.

6. In a truck bolster, a side bearing member within each end thereof, the member having an opening therethrough, a bank of plate springs extending longitudinally within the bolster and passing through said opening, and means within the bolster for supporting the ends of the bank above the bottom of the bolster.

7. In a truck bolster, a side bearing member within each end thereof, the member having an opening therethrough, a bank of plate springs extending through said opening, means within the bolster for supporting the ends of the bank, whereby the bottom of the bank will be spaced above the bottom of the bolster, and an abutment member on the bottom of the bolster beneath each bearing member and engageable thereby for taking the load when the springs go solid.

8. In combination with a body bolster having a center plate and depending side bearing elements, a truck bolster having a guide receiving said center plate for permitting relative swivelling movement of the truck and body bolsters, side bearing members mounted within the truck bolster near the ends thereof, rollers engaged between said bearing members and said depending bearing elements, a plurality of longitudinally extending banks of plate springs mounted within the ends of the truck bolster for supporting said bearing members, and suspension means for said banks of springs.

9. In combination with a body bolster having a center plate and depending side bearing elements, a truck bolster having a guide receiving said center plate for permitting relative swivelling and lateral movement of the truck and body bolsters, side bearing members mounted within the truck bolster near the ends thereof, rollers engaged between said bearing members and said depending bearing elements, a plurality of banks of plate springs mounted within the ends of the truck bolster for supporting said bearing members, and suspension means for said banks of springs for permitting bodily shifting thereof within the truck bolster when lateral motion occurs.

10. In combination with a body bolster having a depending center plate and depending bearing elements, a truck bolster having a guide receiving said center plate and permitting lateral motion of the body bolster and swivelling movement thereof with respect to the truck bolster, side bearing members located within the end portions of the truck bolster, rollers engaged between said bearing members and said bearing elements, elongated plate springs supporting the bearing members, and shackles connected with the ends of the plate springs for suspending the same within the truck bolster.

11. In combination with a body bolster having a depending center plate and depending bearing elements, a truck bolster having a guide receiving said center plate and permitting lateral motion of the body bolster and swivelling movement thereof with respect to the truck bolster, side bearing members located within the end portions of the truck bolster, rollers engaged between said bearing members and said bearing elements, elongated plate springs supporting the bearing members, and shackles connected with the ends of the plate springs for suspending the same within the truck bolster, said bearing members having openings therethrough and the plate springs being located within said openings whereby said bearing members will operate as shackles.

12. In combination with a body bolster having a depending center plate and depending bearing elements, a truck bolster having a guide receiving said center plate and permitting lateral motion of the body bolster and swivelling movement thereof with respect to the truck bolster, side bearing members located within the end portions of the truck bolster, rollers engaged between said bearing members and said bearing elements, elongated plate springs supporting the bearing members, and shackles connected with the ends of the plate springs for suspending the same within the truck bolster, said plate springs being arranged in a plurality of banks.

13. In combination with a body bolster having a depending center plate and depending bearing elements, a truck bolster having a guide receiving said center plate and permitting lateral motion of the body bolster and swivelling movement thereof with respect to the truck bolster, side bearing members located within the end portions of the truck bolster, rollers engaged between said bearing members and said bearing elements, elongated plate springs supporting the bearing members, and shackles connected with the ends of the plate springs for suspending the same within the truck bolster, the springs being pivotally suspended by the shackles to be capable of bodily longitudinal movement to permit lateral motion of the body bolster.

14. In a truck bolster, a side bearing member within each end thereof having openings therethrough, banks of elongated plate springs engaged through said openings, shackle members pivotally connected with the ends of the springs, and means pivotally suspending the shackles.

15. In a truck bolster, a side bearing member within each end thereof having openings therethrough, banks of elongated plate springs engaging bearing members projecting through said openings, springs supported at their ends by links, the angularity of said links such that alternate lifting or lowering of the bearings on opposite sides of the bolster is obtained upon lateral motion.

16. In a truck bolster, a side bearing member within each end thereof, banks of elongated plate springs connected with and supporting said side bearing members, and pivotally mounted supports for the springs.

17. In a truck bolster, a side bearing member within each end thereof, banks of elongated plate springs extending longitudinally within the bolster and carrying said side bearing members for supporting a body bolster, and a mounting for the springs permitting bodily shifting thereof longitudinally of the truck bolster upon lateral motion of the body bolster.

18. In a truck bolster, a side bearing within each end thereof supporting a body bolster, banks of plate springs supporting the side bearings, said banks being shiftable longitudinally of the truck bolster upon lateral motion of the body bolster.

19. In combination, a truck bolster, side bearings at the end portions thereof, a body bolster supported upon said side bearings and capable of lateral motion, and resilient supporting means for the side bearings movably mounted within the truck bolster and movable with the side bearings in accordance with lateral motion of the body bolster.

20. In combination, a truck bolster, a body bolster mounted for lateral motion, side bearings movable with the body bolster, and swingably supported resilient means within the truck bolster carrying the side bearings.

21. In combination, a truck bolster, a body bolster mounted for lateral motion, side bearings movable with the body bolster, and swingably supported resilient means within the truck bolster carrying the side bearings and arranged to elevate one and lower the other upon lateral motion of the body bolster in either direction.

22. In combination, a truck bolster, a body bolster mounted for lateral motion, side bearings movable with the body bolster and movable with respect to the truck bolster, cushion means supporting the side bearings, and means within the truck bolster for elevating one side bearing and its cushioning means and lowering the other upon lateral motion of the body bolster.

23. In a railway truck, a truck bolster, a body bolster mounted thereon for lateral motion, side bearings carried by the truck bolster for supporting the body bolster, spring means beneath the side bearings, and means for supporting the spring means and bodily elevating the same and consequently the side bearing at that side of the truck toward which the body bolster moves during lateral motion whereby to produce a banking action.

In testimony whereof I affix my signature.
PERCY R. DRENNING.